United States Patent

[11] 3,614,326

[72] Inventor Joe Cameron
Millbrook, Ala.

[21] Appl. No. 839,480
[22] Filed July 7, 1969
[45] Patented Oct. 19, 1971
[73] Assignee International Automated Electronics Corporation

[54] TELEPHONE ACTUATED SWITCH
5 Claims, 3 Drawing Figs.

[52] U.S. Cl. .......... 179/2 A, 179/41 A
[51] Int. Cl. .......... H04m 11/00
[50] Field of Search .......... 179/2 TC, 1 C, 2 C, 2 E, 2 A, 41 A, 6, 81, 7.1

[56] References Cited
UNITED STATES PATENTS

| | | | |
|---|---|---|---|
| 3,254,159 | 5/1966 | Condict | 179/1 X C |
| 3,366,744 | 1/1968 | Miller | 179/41 A |
| 3,383,467 | 5/1968 | New | 179/2 A |

*Primary Examiner*—Ralph D. Blakeslee
*Attorney*—Jennings, Carter & Thompson

ABSTRACT: An electronic switch serving as a communications link between a remotely situated telephone caller and a headquarters. The communications link is adapted to connect a two-way radio to the telephone lines at a subscriber station, which receives a message from the caller, and relays it to headquarters. Likewise, a message from headquarters is relayed through the communications link to the caller.

Joe Cameron
INVENTOR.
BY Clarence A. O'Brien
and Harvey B. Jacobson
Attorneys

Joe Cameron
INVENTOR.
BY Clarence A. O'Brien
and Harvey B. Jacobson
Attorneys

TELEPHONE ACTUATED SWITCH

The present invention relates to electronic switching devices for use in communication relay systems.

The present invention has a primary operational mode which is particularly adapted to link a telephone caller with a remotely situated mobile facility furnished with a two-way radio by means of an intermediate communications relay. To effect such communication, a caller may employ a telephone at hand instead of carrying electronic radio gear with him. A second operational mode of the present invention utilizes the ringing voltage and a bank of tone generators to operate a selected tone relay to turn on a utilization device or devices.

Civil band radio furnishes a mobile facility with means for communicating with a fixed location. However, two-way radio gear is required at both points and this may be impractical when the ground location changes from time to time. Thus, by way of example, if a person travelling from place to place is desirous of communicating with another in a mobile facility such as a boat or auto, he would always need a two-way radio with sufficient operating range at this disposal. Inasmuch as telephones are available virtually everywhere, it would be desirable to have the travelling person make use of a phone for transmitting and receiving messages between himself and the other party.

Figure 1:
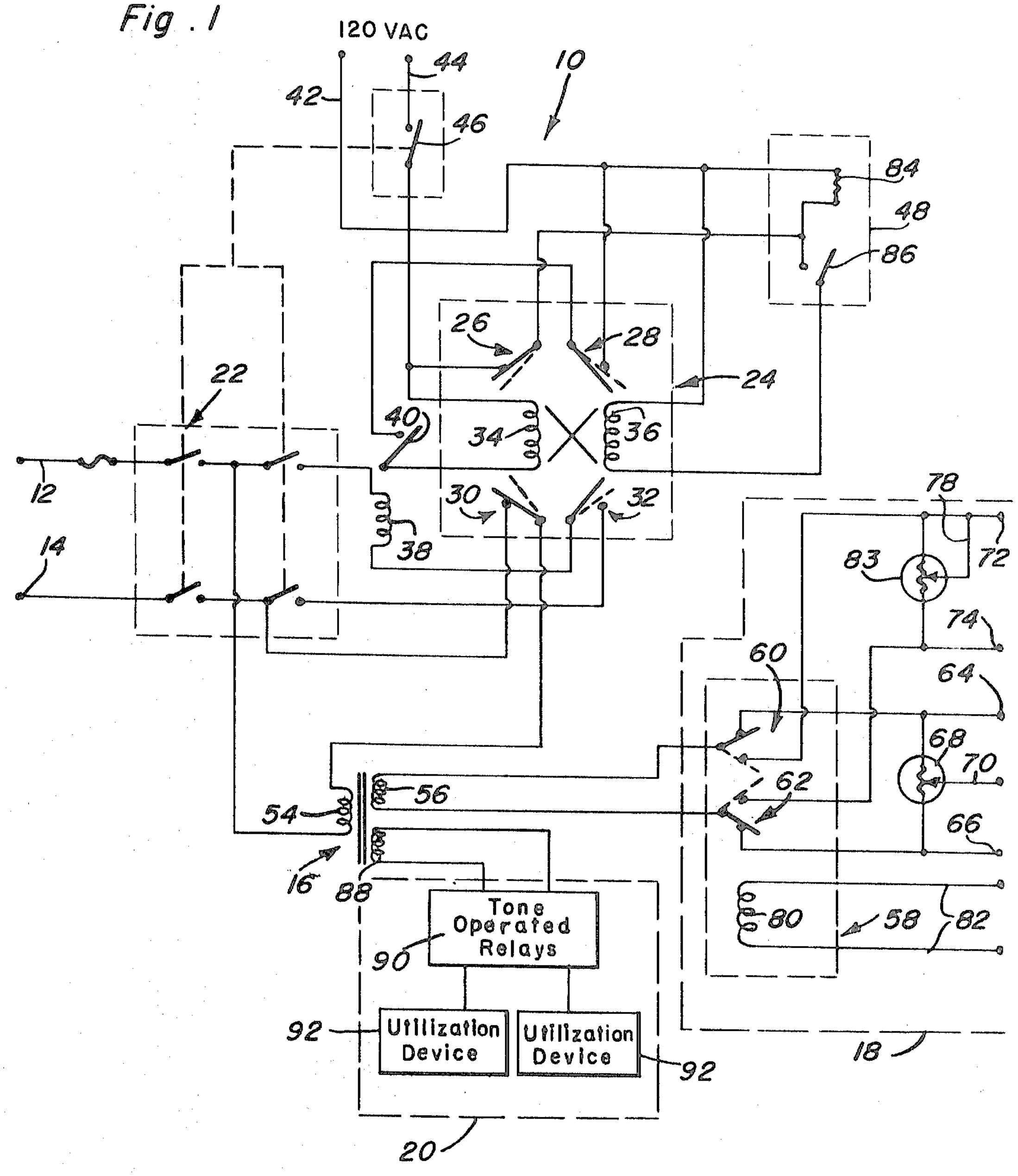

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 illustrates an electrical schematic diagram of the electronic switch of the present invention.

Figure 2:
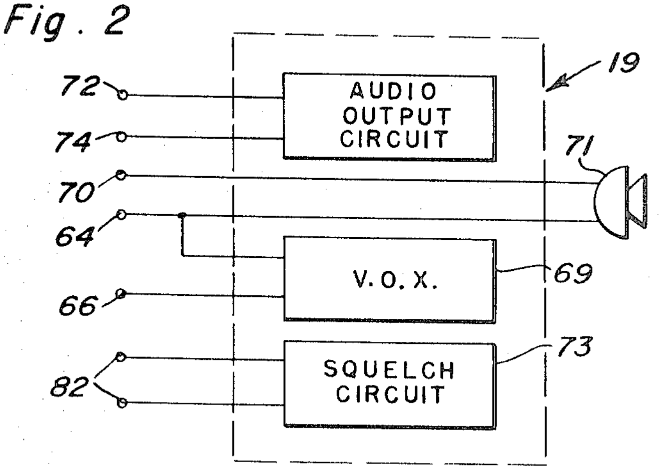

FIG. 2 schematically illustrates the two-way radio with which the invention is associated.

Figure 3:
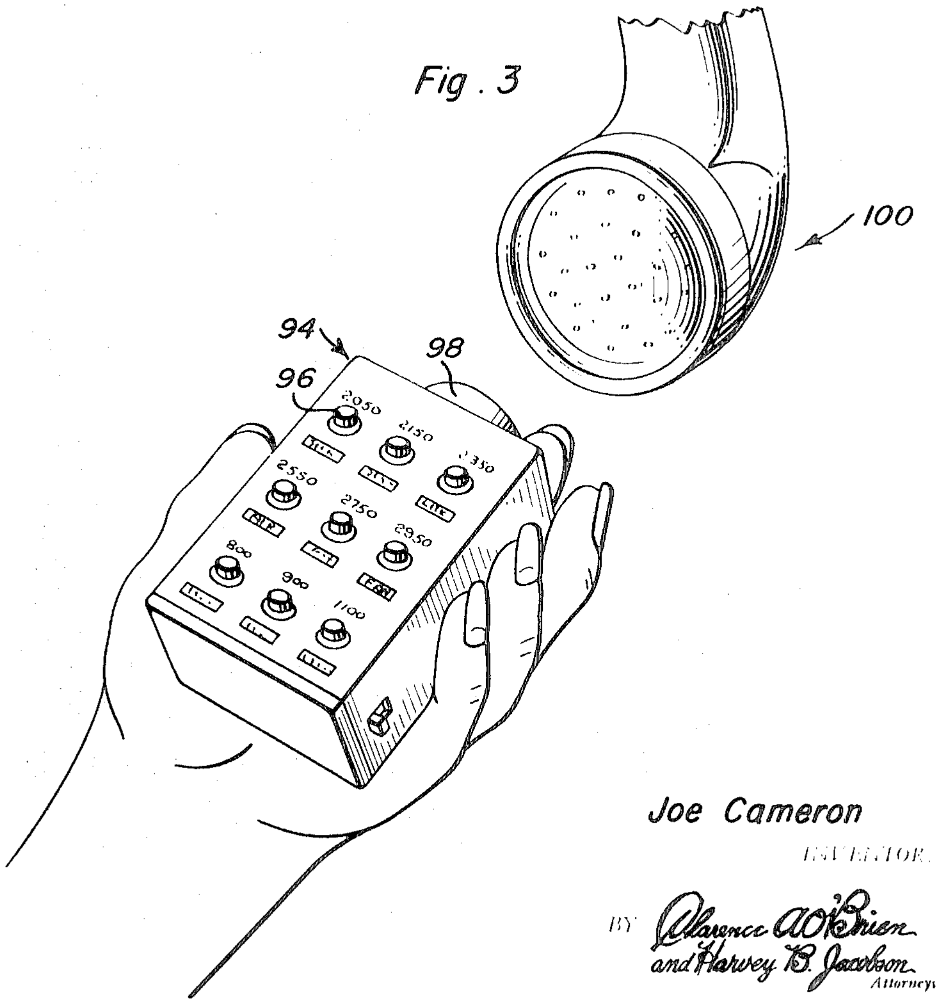

FIG. 3 is a perspective view of a hand-held multiple oscillator unit.

Referring to the drawing, reference numeral 10 generally indicates the electronic switch representative of the present invention which includes input lines 12 and 14 connected to the telephone lines of a subscriber telephone station. This station serves as a communication link or relay to a mobile facility or a location where telephones are unavailable.

First, dealing with the communications link, the electronic switch 10 includes audiocoupling means 16 permitting communication between a caller and the mobile facility by virtue of a two-way radio distributor 18 discussed hereinafter. The distributor 18 is connected to a transmitter and a receiver constituting a two-way radio 19 at the location of the subscriber station as shown in FIG. 2. Because conventional transmitter and receiver portions are employed, these components are not disclosed in detail.

In the second operational mode of the invention to be discussed hereinafter, a circuit indicated by 20 causes a utilization device 92 to be turned on when a ringing voltage is produced across the telephone lines 12 and 14 followed by the transmission of the proper audiotone.

The central control for the present invention is furnished by a toggle relay generally indicated by reference numeral 24 having four single pole single throw switch sections indicated by 26, 28, 30 and 32. As illustrated in FIG. 1, the initial condition of each switch section is indicated by the dotted lines of the selector switch elements. The toggle relay 24 includes a first coil 34 causing the switch sections to assume a set condition represented by the solid lines. A second coil 36 is provided in the relay 24 for causing reset of the switch sections to the initial condition as hereinafter described.

When a caller dials the number of the subscriber telephone station to which input lines 12 and 14 are connected, a ringing voltage is generated across these lines. It is presently contemplated that the number of the subscriber station will be unlisted thereby restricting use of the invention to authorized persons only. When the on-off switch 22 is closed, ringing current is caused to flow through the input lines in a serial path including switch section 32 of toggle relay 24 and relay coil 38 associated with a single pole single throw switch 40. Upon energization of the relay coil 38, the switch 40 is closed. The switch 40 is connected in series with the toggle relay coil 34 so that closing of switch 40 connects the coil across 120-VAC lines 42 and 44 via the closed switch section 28 of the toggle relay 24. Continuity in the latter mentioned circuit depends upon manual enabling of the single pole single throw switch 46 connected in line with supply line 44 and mechanically ganged to the on-off switch 22.

Energization of relay coil 34 results in the toggle relay 24 assuming a set condition causing the switch sections 26, 28, 30 and 32 to switch to the positions indicated by the solid lines. Once set, switch section 26 connects an electronic time delay relay 48 across the 120-VAC line 42 and 44. The relay 48 serves as timing means for the circuit and may be adjusted from 30 to 180 seconds which determines the period of time allowed for communication between the caller and the electronic switch means 10. At the end of the adjusted period, the entire circuit is reset to an initial condition as will be explained hereinafter.

Previously mentioned coupling means 16 is more particularly an audiotransformer having a primary 54 characterized by an olmic resistance of 600–1000 ohms which becomes connected across the input lines 12 and 14 upon the switching of switch section 30 to the set condition. The resistance of the transformer primary is carefully chosen so that it places the correct load across the telephone lines. Once a ringing voltage occurs across the input lines 12 and 14, the load of the primary 54 is sufficient to cause holding or answering of the incoming call during the timing cycle. Further, the primary 54 serves as the input for the audiotransformer 16 which has a secondary or output winding 56. When a caller begins to dictate a message, the speech signals produced across the input lines 12 and 14 will be impressed across the audiotransformer primary 54, the signals being coupled to the transformer secondary 56. The output terminals of the secondary winding 56 are connected to the movable elements of single pole, single throw switches 60 and 62 forming a part of a control relay 58.

During input communication the relay switch 60 switches to an output line 64 and the relay switch 62 switches to a second output line 66, the output lines 64 and 66 being adapted for connection to a voice operated relay 69 (vox) for keying the transmitter of radio 19 into operation. The input terminals of a potentiometer 68 are connected between the output lines 64 and 66 while the potentiometer wiper is connected to an additional output line 70. Output lines 64 and 70 are coupled to the microphone 71 of the transmitter. In operation, the potentiometer is adjusted to ±5 kc. on transmit. Thus, the potentiometer 68 may be characterized as a sensitivity switch for the voice operated relay.

During those times when the mobile facility is transmitting a message, the distributor 18 switches its state to inhibit transmission and enabling the receiver of the two-way radio 19 at the subscriber station to operate through the electronic switch 10. To achieve this disabling function, a coil 80 forming a part of the relay 58 causes the switching of switches 60 and 62 to a second state indicated by the dotted line. Thus, the transmitter output lines 64, 66 and 70 are no longer connected to the secondary 56 of the audiotransformer 16. Instead, when the carrier frequency of the mobile facility transmission is detected, a squelch circuit 73 in the receiver of the radio at the subscriber station becomes actuated and causes the generation of a signal across input lines 82 connected across the relay coil 80, which causes the switching of switches 60 and 62 to the condition illustrated by dotted line. In this mode, input lines 72 and 74 from the receiver at the subscriber station are connected to the terminals of the audiotransformer winding 56 through the switches 60 and 62. The transformer winding 56 now acts as an input or primary winding for coupling an audiosignal from the receiver to the transformer winding 54 which now acts as a secondary. The message signals occuring across the terminals of winding 54 are routed to the telephone lines 12 and 14 now serving as output lines. The signal flow to the output lines includes switch section 30 of toggle relay 24. A second potentiometer 83 is connected between the input receiver lines 72 and 74. A wiper contact 78 of the potentiometer is connected to line 72 and is adjusted until 0 db. on receiver is realized.

From experience, the preselected timing cycle determined by the electronic time delay relay 48 is selected to exceed the maximum duration of any communication. During this timing cycle, a current sensitive element 84 forming a part of the delay relay 48 is connected across the voltage supply lines 42 and 44. By way of example, the element 84 may be of the type which heats up to a sufficient temperature after a preselected period of time which causes the closing of bimetallic switch contacts 86. At the end of the timing cycle the switch 86 connects the voltage lines 42 and 44 across the reset coil 36 of toggle relay 24 through switch section 26 of the relay 24. Upon application of the supply voltage across coil 36, the toggle relay 24 is reset to its initial condition thereby disconnecting the electronic switch 10 from the telephone lines 12 and 14 terminating an operating cycle. The electronic switch 10 will operate in the same manner as just described when a subsequent call is received by the subscriber station.

The second operational mode of the present invention is employed to serve a different function than the first-mentioned one. The electronic switch 10 is employed to cause actuation of the utilization device 92 located at the subscriber station. In its simplest form, the two-way radio distributor 18 would not be employed when contact with a mobile facility is not required. However, it is to be understood that if actuation of a utilization device at a mobile facility is desired, the distributor 18 is employed to cause the transmitter at the subscriber station to relay a audiotone from a caller to a tone operated relay assembly 90 controlling the utilization device. In either event, means for actuating the utilization device includes a secondary winding 88 associated with audiotransformer 16. The secondary 88 is coupled to the conventional tone operated relay assembly having multiple switch contact sets individually closed when an associated tone is generated across the input lines 12 and 14. By way of example, one such tone operated relay assembly is manufactured by the Dynavox Corporation. The outputs of the tone operated relay assembly are connected to respective utilization devices 92 which may be in the form of an electrical appliance or the like. Thus, upon reception of a proper tone generated by a telephone caller or mobile radio unit, the associated utilization device is turned on from a remote location regardless of the time during the day. A mobile radio unit can also operate the utilization device by transmitting the proper audiofrequency tone or tones, remotely by wireless radio. Although the electric time delay relay 48 causes disconnection of the subscriber telephone station from the telephone lines in the manner previously discussed, the utilization device 92 will continue to function unless a timer is provided for causing inoperativeness of the utilization device after a preselected timing interval or a second call is placed and the use of another, different avoid tone is used to turn it off.

Referring to FIG. 3, a multiple tone oscillator unit is denoted by 94 to which tone operated relay assembly 90 responds. The unit includes a self-contained battery supply for selectively energizing one of a plurality of solid state audio oscillators having different frequency outputs. Selection is made by depressing the switch 96 of a desired oscillator which completes an energizing circuit through the oscillator. The particular circuitry of the oscillators are of conventional design and need not be discussed in detail herein. The unit includes a miniature speaker 98 which is held to the phone receiver 100 and when a switch 96 is depressed, an associated frequency is generated for transmission over the phone lines to the input of electronic switch 10.

By adding a second electronic time delay relay into the input section of the electronic switch 10, security means can be effected for preventing an accidental phone call from operating the equipment. Thus, a knowledgeable telephone caller would know that he must hold his telephone for a preselected security interval until the electronic switch 10 begins to operate. A mistaken caller receiving no response from the called number would quickly hand up thereby preventing operation of the electronic switch 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A telephone operated remote control system connected between telephone subscriber lines and a two-way radio having transmitter and receiver portions, the system comprising relay switch means set in response to a ringing voltage occurring at the telephone lines, the voltage being indicative of an incoming call, circuit holding means connected by the relay switch means to the telephone lines to permit answering of the subscriber telephone, timing means actuated by the setting of the relay switch means for controlling a system operation cycle, audiocoupling means connecting the telephone lines and the two-way radio through the switch means to effect two-way communication, the timer means producing a reset signal at the termination of an operating cycle for resetting the relay switch means to an initial condition whereby the telephone lines are disconnected from the system thus ending further communication.

2. The system set forth in claim 1 wherein the system operates in a transmit mode and wherein the audiocoupling means comprises an audiotransformer having primary and secondary windings, the primary winding being connected through the switch means to the telephone lines, the secondary winding being connected to the transmitter portion of the two-way radio.

3. The system set forth in claim 1 wherein the holding circuit means includes the primary winding of the audiotransformer connected across the telephone lines, the winding having a preselected resistance for causing the answering of the subscriber telephone subsequent to generation of a ringing voltage on a telephone line.

4. The system set forth in claim 2 together with switch means selectively connecting the audio coupling means from the receiver portion of the two-way radio to the telephone lines via the relay switch means in response to an incoming message.

5. A telephone operated automatic remote control system for operating at least one electrical device at the location of a subscriber station, the system comprising relay switch means set in response to a ringing voltage occurring on the telephone lines of the subscriber station, the voltage being indicative of an incoming call, circuit holding means connected by the relay switch means to the telephone lines to permit answering of the subscriber telephone, timing means actuated by the setting of the relay switch means for controlling a system operation cycle, selectively actuatable tone operated switch means being associated with each electrical device, each switch means having an input and an output, audiocoupling means serially connected with the telephone lines, the input of a selected tone operated switch means and the relay switch means, the selected tone operated switch means maintaining ready status when the relay switch means is set in response to the ringing voltage, the output of the tone operated switch means being adapted to turn on the associated electrical device at the subscriber station, termination of the operation cycle causing reset of the relay switch means resulting in disconnection of the call.